US011878505B2

(12) United States Patent
Dischinger et al.

(10) Patent No.: US 11,878,505 B2
(45) Date of Patent: Jan. 23, 2024

(54) METHOD FOR CONTROLLING A DISTRIBUTOR ROLLER CONTROL SYSTEM

(71) Applicant: Heidelberger Druckmaschinen AG, Heidelberg (DE)

(72) Inventors: Michael Dischinger, Sinsheim (DE); Peter Heiler, Forst (DE); Martin Mayer, Ladenburg (DE); Michael Postels, Dossenheim (DE); Michael Ruck, Reilingen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 18/079,157

(22) Filed: Dec. 12, 2022

(65) Prior Publication Data

US 2023/0182463 A1 Jun. 15, 2023

(30) Foreign Application Priority Data

Dec. 14, 2021 (DE) ..................... 10 2021 132 914.0

(51) Int. Cl.
*B41F 13/20* (2006.01)
*B41F 31/15* (2006.01)

(52) U.S. Cl.
CPC .............. *B41F 13/20* (2013.01); *B41F 31/15* (2013.01)

(58) Field of Classification Search
CPC ................................ B41F 31/15; B41F 31/20
See application file for complete search history.

(56) References Cited

U.S. PATENT DOCUMENTS

| | | | | |
|---|---|---|---|---|
| 4,205,605 A * | 6/1980 | Greiner | B41F 31/15 101/206 |
| 5,029,526 A | 7/1991 | Kipphan et al. | |
| 5,170,711 A * | 12/1992 | Maier | B41F 33/0027 101/365 |
| 6,615,726 B2 | 9/2003 | Douillard et al. | |

FOREIGN PATENT DOCUMENTS

| | | |
|---|---|---|
| DE | 3614555 C2 | 11/1990 |
| DE | 29812966 U1 | 9/1998 |
| DE | 10154810 A1 | 7/2002 |
| DE | 102006008002 A1 | 8/2007 |
| DE | 102014224893 A1 | 6/2015 |

* cited by examiner

*Primary Examiner* — Matthew G Marini
*Assistant Examiner* — Leo T Hinze
(74) *Attorney, Agent, or Firm* — Laurence A. Greenberg; Werner H. Stemer; Ralph E. Locher

(57) ABSTRACT

In a method for controlling a distributor roller of a printing press, the phase position of at least one reversal point of the distributor roller is changed automatically during the ongoing printing. A change is made to the phase position for every specified number of revolutions of a plate cylinder.

5 Claims, 2 Drawing Sheets

METHOD FOR CONTROLLING A DISTRIBUTOR ROLLER CONTROL SYSTEM

CROSS-REFERENCE TO RELATED APPLICATION

This application claims the priority, under 35 U.S.C. § 119, of German Patent Application DE 10 2021 132 914.0, filed Dec. 14, 2021; the prior application is herewith incorporated by reference in its entirety.

FIELD AND BACKGROUND OF THE INVENTION

The present invention relates to a method for controlling a distributor roller of a printing press.

The phase position of a reversal point of the axial movement of the distributor roller can be changed by an appropriate control system. Phase position means the angle of rotation of the plate cylinder at which the distributor roller is situated at its reversal point.

German patent DE 36 14 555 C2, corresponding to U.S. Pat. No. 5,029,526, discloses a control method in which the phase position—also called application time—is set when the press is set up.

In many cases, ghosting stripes can thus be prevented but this is not the case when using inks and printing plates which have a particularly high tendency to ghosting.

SUMMARY OF THE INVENTION

The object of the invention is to provide a method which is effective even in the case of such inks and printing plates.

The object is achieved by a method for controlling a distributor roller of a printing press, characterized in that the phase position of at least one reversal point of the distributor roller is changed automatically during the ongoing printing, wherein a change is made to the phase position for every specified number of revolutions of a plate cylinder.

An advantage of the method according to the invention is that a higher print quality is thus achieved even when using unfavorable materials (inks, printing plates).

In a development, the number is no more than eight revolutions of the plate cylinder.

The phase position can furthermore be continuously changed during the printing.

The change to the phase position of the distributor roller can be controlled according to a different law of movement than a change to the phase position of a further distributor roller which is situated in the same printing unit as the first-mentioned distributor roller.

The distributor roller which has the greater amount of inking can here be controlled using a law of movement which is optimized in terms of preventing ghosting, and/or the distributor roller which has the smaller amount of inking can be controlled using a law of movement which is optimized in terms of reducing gradual fading.

There can be a phase shift between the phase position of the distributor roller and the phase position of a further distributor roller which is situated in a different printing unit. It is assumed here that both printing units of the printing press have the same structure and the two distributor rollers have the same installed position in the respective printing unit. An advantage of the phase shift between the printing units is that faulty images which result, for example, from distributor roller downtime are eliminated.

The distributor roller can bear against a form roller which rolls on the plate cylinder during printing. An axial oscillating movement of the form roller can be driven by the distributor roller via circumferential surface friction in such a way that a reversal in direction of the form roller takes place while the latter rolls over a cylinder gap of the plate cylinder. The form roller is preferably the form roller of all the form rollers of the inking unit which has the greatest amount of inking.

The distributor roller which bears against the last form roller of the inking unit in the direction of rotation of the plate cylinder can be controlled according to a law of movement with a lower speed, for example with one axial oscillation of the distributor roller every four revolutions of the plate cylinder.

The distributor roller which bears against the first form roller of the inking unit in the direction of rotation of the plate cylinder can be controlled according to a law of movement with a higher speed, for example with one axial oscillation of the distributor roller every two revolutions of the plate cylinder.

Any of the developments explained above can be combined with any other.

Other features which are considered as characteristic for the invention are set forth in the appended claims.

Although the invention is illustrated and described herein as embodied in a distributor roller control system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
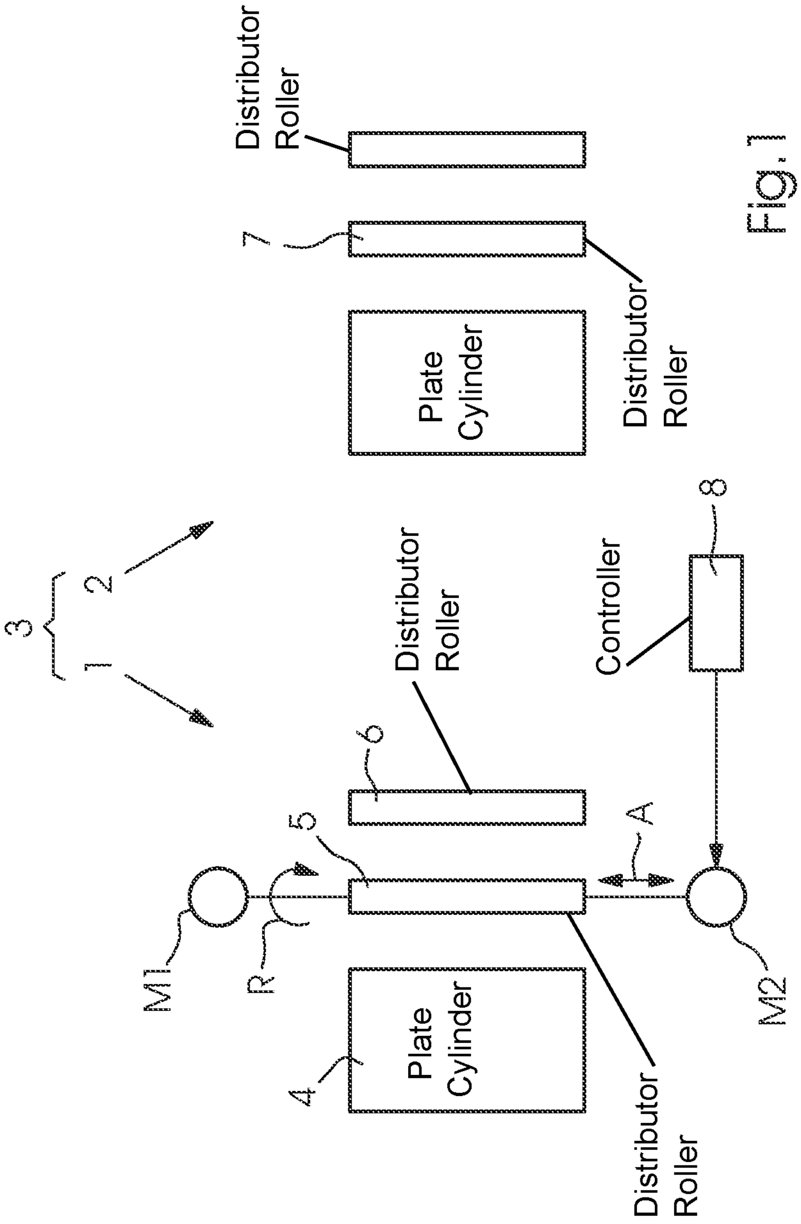
FIG. 1 is an illustration showing a printing press.

Referring now to the figures of the drawings in detail and first, particularly to FIG. 1 thereof, there is shown a printing unit 1 and a printing unit 2 are part of a printing press 3. The printing units 1, 2 are offset printing units. The printing press 3 is a sheet-fed printing press.

The printing unit 1 has a plate cylinder 4 and an associated inking unit with distributor rollers 5, 6. Rotation R of the distributor roller 5 is driven by a motor M1 and its axial movement A by a motor M2.

It is important that the two movements A, R of the distributor roller 5 are driven by different motors M1, M2. This enables the distributor roller 5 to run axially asynchronously with the press while running rotationally synchronously with the press.

The motor M1 can also drive rotation of the plate cylinder 4 and/or the distributor roller 6.

The printing unit 2 has the same structure as the printing unit 1, and a distributor roller 7 of the printing unit 2 is situated in the same position in the inking unit roller train as the distributor roller 5.

Figure 2:
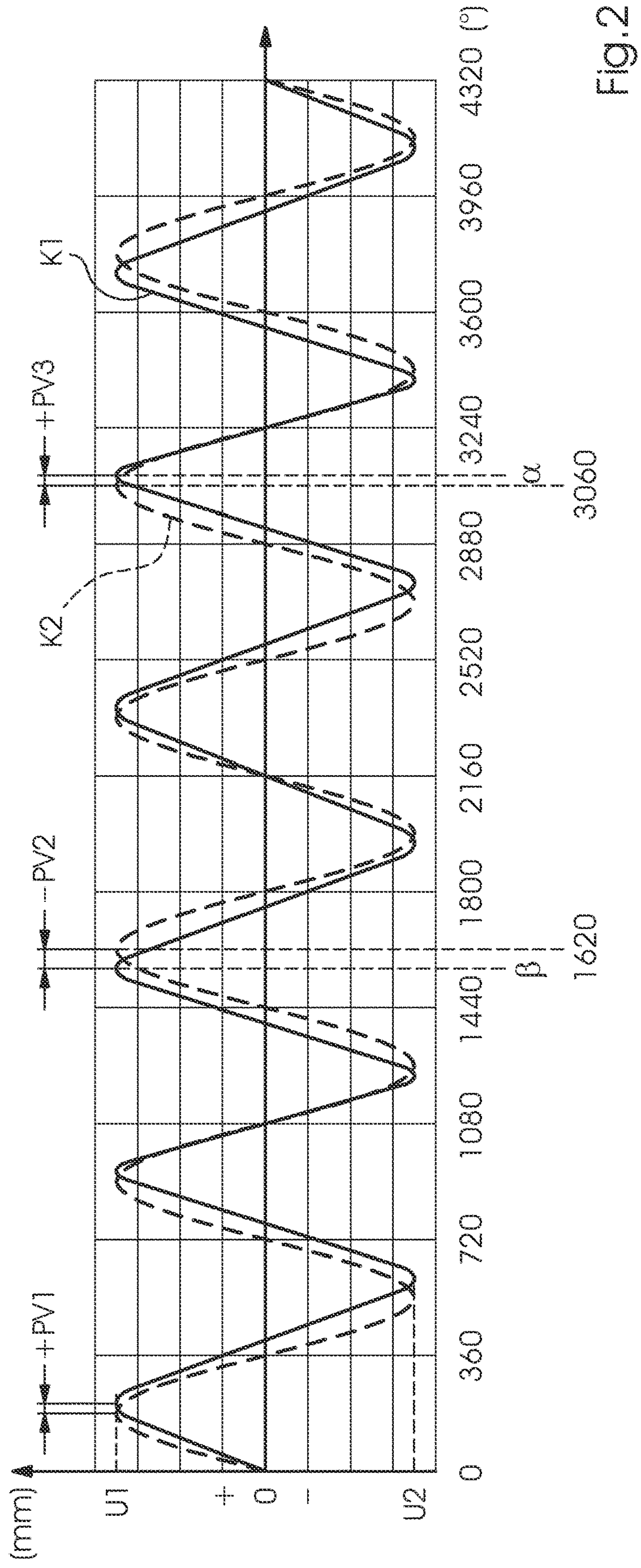
FIG. 2 is a movement graph of a distributor roller.

The motor M2 is activated by a control system 8 according to a law of movement which is illustrated in FIG. 2.

FIG. 2 shows a graph, the x-axis of which represents the press angle and the y-axis the travel of the distributor roller. An angular range from 0° to 4320° is illustrated which corresponds to twelve revolutions of the plate cylinder 4 of 360° each.

The distributor roller 5 oscillates axially back and forth between a reversal point U1 and an opposite reversal point U2.

A curve K1 corresponds to the control system according to the invention and a curve K2 corresponds to a conventional control system and has been plotted purely for comparison purposes. Both curves K1 and K2 show a half-speed oscillation profile in which the distributor roller performs one complete axial oscillation within two plate cylinder revolutions (720°). The curve K2 is a sine curve and the curve K1 is a not sine curve but is the result of a modulation of a sine function.

The curves K1, K2 are synchronous with each other when they pass through zero at a press angle of 0°, 1080°, 2160°, 3240°, and 4320°, i.e. every 1080°.

Between 0° and 1080° and between 2160° and 3240°, the curve K2 leads the curve K1. This means, for example, that the distributor roller 5 controlled according to the invention has not yet passed through zero at 360° and 720°, where the conventionally controlled distributor roller is passing through zero, and instead does so only somewhat later. It is also apparent from the lead that the distributor roller controlled according to the curve K2 is situated at the reversal point U1 at 1620° and the distributor roller 5 controlled according to the curve K1 is already situated at the reversal point U1 at a press angle β. The press angle β is less than 1620° and is between 1440° and 1620°.

Between 1080° and 2160° and between 3240° and 4320°, the curve K2 lags the curve K1. This means, for example, that the conventionally controlled distributor roller 5 passes through zero at 1440° and 1800° and the distributor roller 5 controlled according to the invention at this point is just a short way before it passes through zero. It is also apparent from the lag that the distributor roller controlled according to the curve K2 is situated at the reversal point U1 at 3060° and the distributor roller 5 controlled according to the curve K1 is situated at the reversal point U1 only at a press angle α. The press angle α is greater than 3060° and is between 3060° and 3240°.

A phase shift between the curves K1, K2 is labeled respectively +PV1, −PV2, and +PV3. As can be seen, these phase shifts are of different values and have different signs.

With the exception of the mentioned points of synchronicity, there is a phase shift, the value of which changes continuously, between the curves K1, K2 over the whole profile.

The maximum phase shift per revolution of the plate cylinder 4 is preferably greater than 5°.

The curve K1 can be stored in the control system 8 in the form of a mathematical equation or value table.

The distributor roller 7 can be controlled according to the law of movement represented by the curve K1 but with a specified press angle offset relative to the distributor roller 5.

The distributor roller 6 can be controlled according to a law of movement which deviates from the curve K1, wherein this too is a sine function which has been modulated so that it deviates from the simple sine-wave shape of the curve K2.

The control system according to the invention advantageously effects so-called horizontal distribution, which is particularly effective in terms of preventing ghosting stripes. In the case of this horizontal distribution, the time of the period duration of the axial oscillation can be changed, i.e. can differ from the conventional period duration which is constant in time.

The following is a summary list of reference numerals and the corresponding structure used in the above description of the invention.

LIST OF REFERENCE SYMBOLS

1 printing unit
2 printing unit
3 printing press
4 plate cylinder
5 distributor roller
6 distributor roller
7 distributor roller
8 control system
A axial movement
K1 curve
K2 curve
M1 motor
M2 motor
PV1 phase shift
PV2 phase shift
PV3 phase shift
R rotation
U1 reversal point
U2 reversal point
α press angle
β press angle

The invention claimed is:

1. A method for controlling a distributor roller of a printing press, which comprises the steps of:

automatically changing a phase position of at least one reversal point of the distributor roller during ongoing printing, wherein a change is made to the phase position for every specified number of revolutions of a plate cylinder.

2. The method according to claim 1, wherein the specified number of revolutions is no more than eight.

3. The method according to claim 1, which further comprises controlling the change to the phase position of the distributor roller according to a different law of movement than a change to a phase position of a further distributor roller which is situated in a same printing unit.

4. The method according to claim 1, wherein there is a phase shift between the phase position of the distributor roller and a phase position of a further distributor roller which is situated in a different printing unit.

5. The method according to claim 1, which further comprises continuously changing the phase position.

* * * * *